United States Patent [19]

Thorsell

[11] Patent Number: 4,467,684

[45] Date of Patent: Aug. 28, 1984

[54] PRECISION POSITIONING SYSTEM FOR ROTARY POWER TOOLS

[75] Inventor: Roland H. Thorsell, Corvallis, Oreg.

[73] Assignee: Excor, Inc., Corvallis, Oreg.

[21] Appl. No.: 486,729

[22] Filed: Apr. 20, 1983

[51] Int. Cl.³ .............................................. B27B 5/04
[52] U.S. Cl. ................................. 83/404.1; 83/425.2; 83/432; 83/433; 83/581; 83/699
[58] Field of Search ................ 83/404.1, 404.3, 425.2, 83/425.3, 425.4, 433, 581, 699, 432

[56] References Cited

U.S. PATENT DOCUMENTS 4,277,998  7/1981  Mayo ................................. 83/404.1

*Primary Examiner*—James M. Meister
*Attorney, Agent, or Firm*—D. Paul Weaver

[57] ABSTRACT

Rotary saw blades mounted on primary supports of a truss component cutting machine require angular adjustment to produce various required angle cuts of the truss components without changing the necessary lengths of the components. To achieve this result, the outer face of each rotary saw blade must pivot around a fixed reference axis lying on the outer face of the blade. The system provides a number of diverse precision adjustments of parts on which the saw blades are supported to assure that the blades in all angularly adjusted positions will have their outer faces remaining on the fixed reference pivot axis.

11 Claims, 7 Drawing Figures

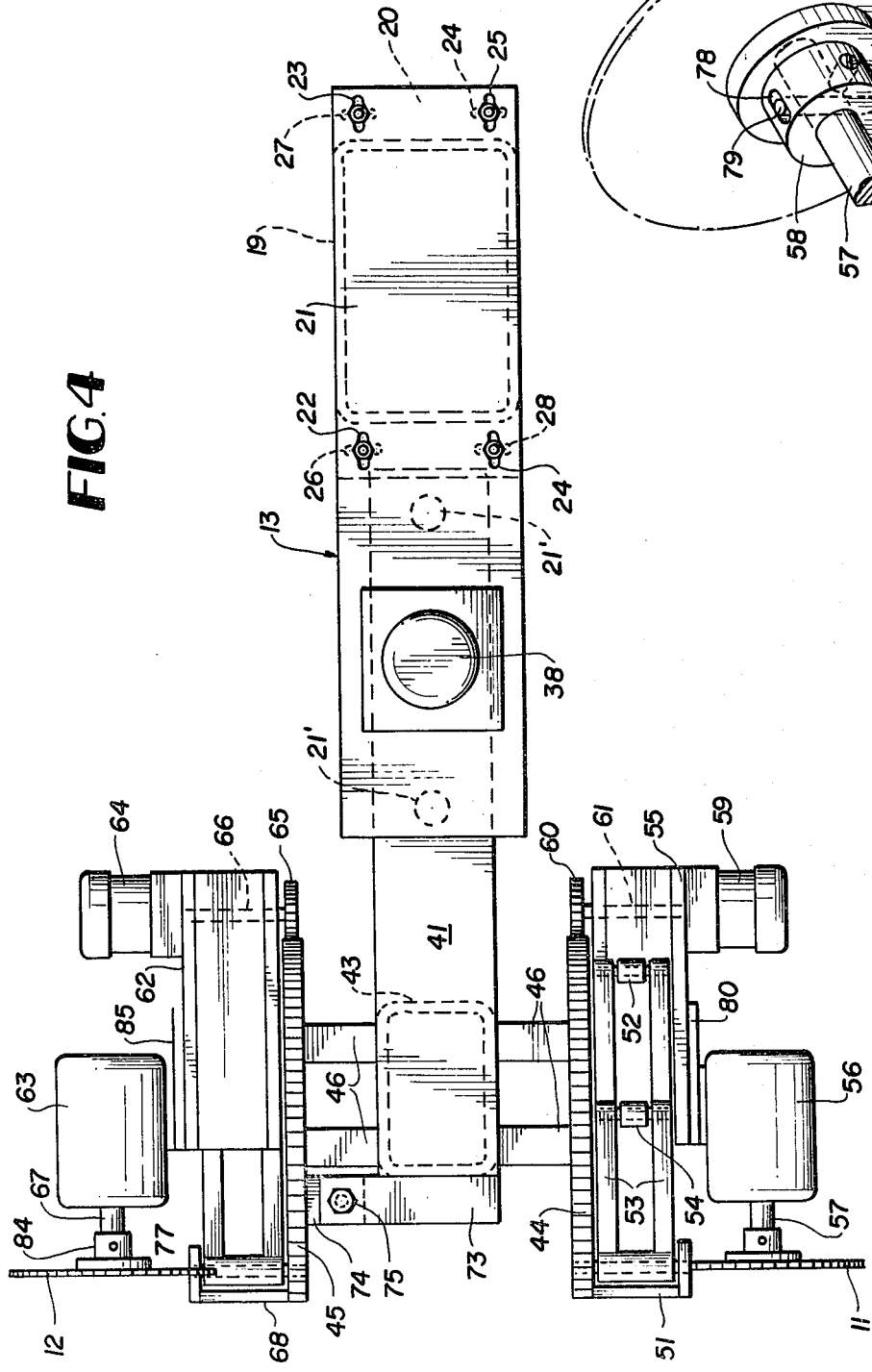

PRECISION POSITIONING SYSTEM FOR ROTARY POWER TOOLS

BACKGROUND OF THE INVENTION

Prior U.S. Pat. No. 4,277,998 discloses an apparatus for cutting wooden truss components at various required angles of cut with precision and on a high volume basis. In the patented apparatus, pieces of lumber are conveyed past a plurality of relatively stationary power driven rotating circular saw blades which are preadjusted to provide the desired cutting angles and prepositioned to establish the required lengths of cut components. In the apparatus, the saw blades are arranged in opposing pairs or groups on two support systems, one of which is fixed and the other of which is movable toward and away from the fixed system. Means is provided on each support system to adjust the saw blades thereon angularly. The established distance between the two support systems determines the length of components being cut.

A pair of lumber conveyors are mounted on each saw blade support system to move the lumber through the rotating saw blades at a uniform rate with the longitudinal axis of the lumber perpendicular to its path of travel past the saw blades. To maintain this relationship, the conveyors on the two support systems are driven synchronously.

In order that the length of the cut lumber not change when the angle of the saw blades is changed, the outer or forward face of each saw blade must rotate around a pre-established precision pivot axis.

In the practical use of the prior patented machine, it has been discovered that it is virtually impossible to position the opposing groups of saw blades on the two support systems and maintain their positioning with the outer faces of the blades precisely located on the described pivot axes. The inevitable build up of machine tolerances in the apparatus, which is a relatively large apparatus, renders it almost impossible to adjust the saw blades with sufficient precision to achieve the objectives stated in the prior patent with conventional adjusting means built into the apparatus.

Accordingly, it is the prime object of this invention to provide a precision adjustment system for the apparatus disclosed in the above-mentioned patent which will enable the positioning of the saw blades on the two support systems with their outer faces exactly on the predetermined axes around which the saw blades must pivot to various angle cutting positions without changing the lengths of truss components being cut by the apparatus.

More particularly, the present invention provides a complete series of adjustments of the saw blades on each support system of the apparatus whereby the blades of each support system can be bodily raised and lowered and bodily adjusted in a horizontal plane in all directions. Furthermore, in accordance with this invention, the individual saw blades and their drive motor mounts are adjustable on the pantograph linkage which carries them, and the gear sectors around which the individual saw blades and the associated pantograph linkages travel are adjustable bodily in multiple directions on the primary support system.

In essence, the present invention provides a complete substantially universal adjusting system for the saw blades of the apparatus assuring that each blade can be precisely located on the required pivot axis and will remain on such axis in all angularly adjusted positions of the blade. The disclosed adjusting system is critical and necessary for a completely successful employment of the apparatus in U.S. Pat. No. 4,277,998 to achieve the maximum benefits thereof in the cutting of truss lumber components.

While the present invention is disclosed in terms of a primary support system on which a single pair of saw blades are mounted, it should be understood that the invention is not limited to this arrangement and additional pairs of blades can be provided on additional primary supports in the apparatus and adjusted with precision by means of the disclosed universal adjusting means. Furthermore, the invention is not limited to adjusting saw blades and may be employed in connection with any rotating cutting tool required to cut any type of material.

Other features and advantages of the invention will become apparent during the course of the following description.

BRIEF DESCRIPTION OF THE DRAWINGS

FIG. 4 is a plan view of the apparatus unit.

FIG. 7 is a perspective view showing the safety mounting of a saw blade on its drive motor shaft.

DETAILED DESCRIPTION

Figure 1:
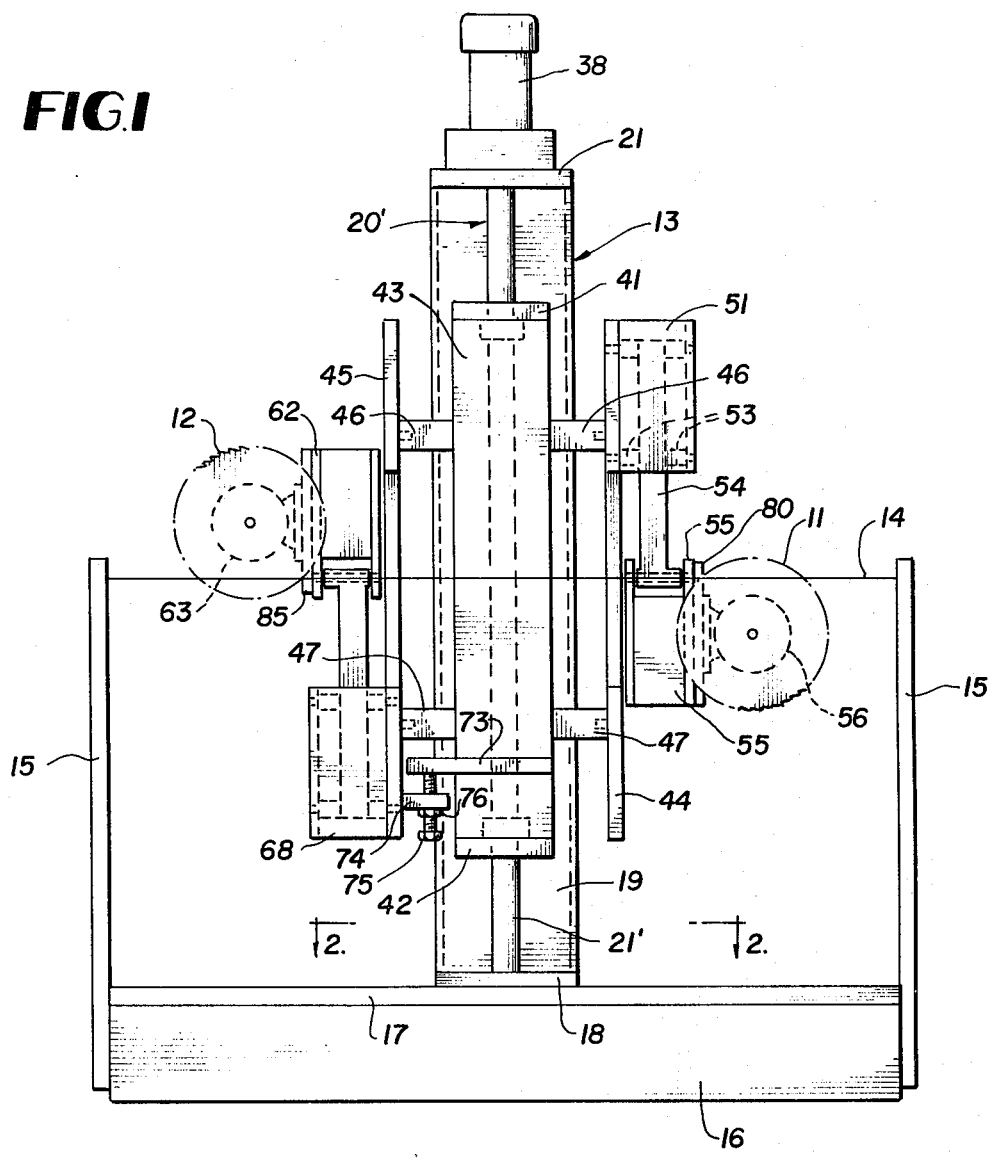
FIG. 1 is a side elevation of one basic support system for two rotating saw blades in a lumber component cutting apparatus according to the invention.

Referring to the drawings in detail wherein like numerals designate like parts, and incorporating herein by reference the disclosure of prior U.S. Pat. No. 4,277,998, a precision pivot axis 10 for the two saw blades 11 and 12 of the primary support system 13 shown in the drawings is established by a taut rigging wire 14 disposed in a horizontal plane and strung between two rigging posts 15 which rise from the base frame 16 of the primary support system 13. For the purpose of completely understanding the present invention, the support system 13 herein mounting the two saws 11 and 12 can be considered as corresponding to either the stationary or the movable support units for the opposing gangs of rotary saw blades in the referenced prior patent.

Figure 3:
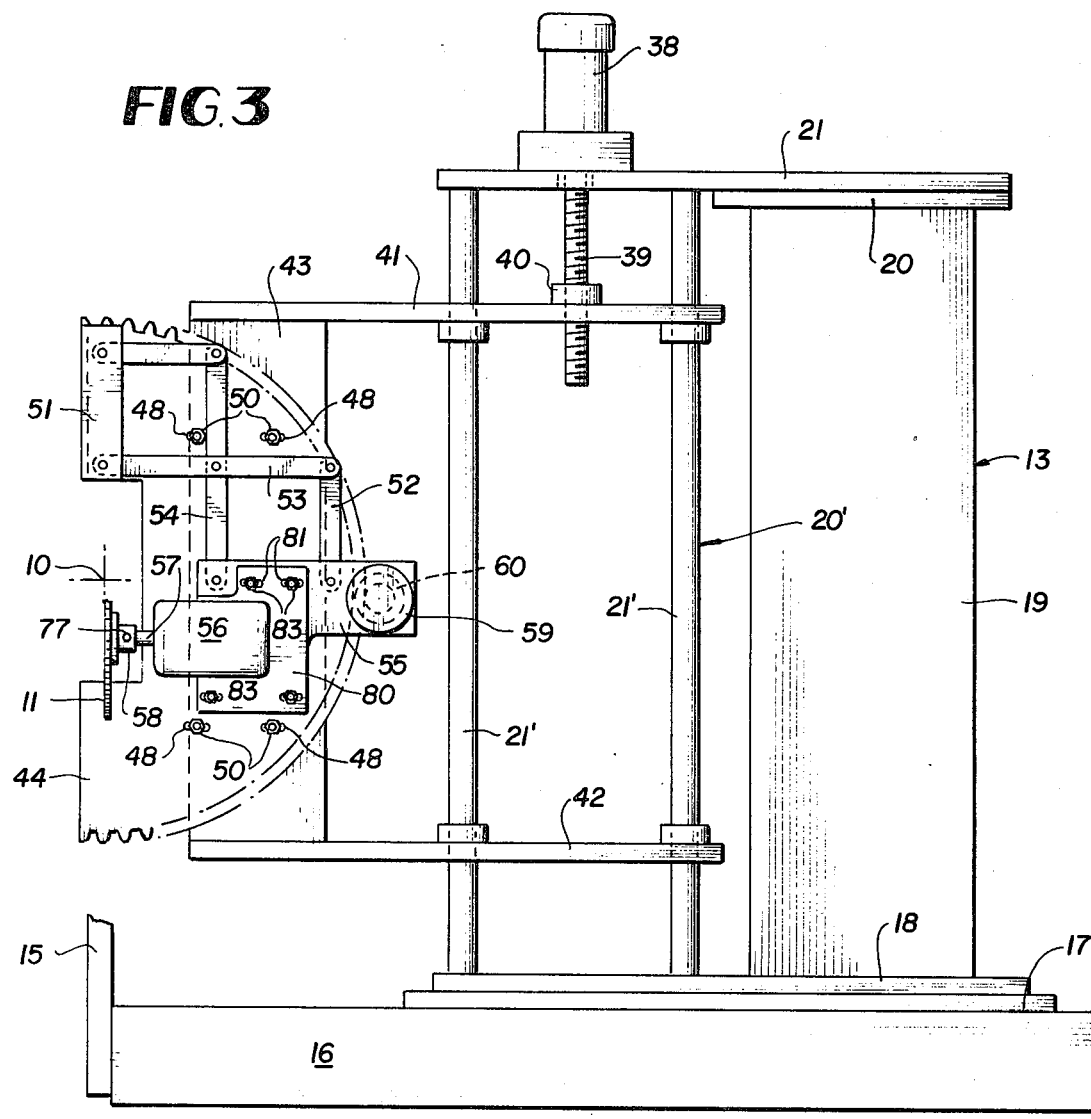
FIG. 3 is an end elevation of the apparatus unit shown in FIG. 1.

With particular reference to FIG. 3, a cutting head support frame mounting plate 17 is fixed rigidly to the base frame 16 of the support system 13, which may be stationary or movable with relation to an opposing saw blade support system, not shown in the drawings. A sub-base plate 18 is adjustably mounted on the mounting plate 17, as will be further described. An upright cutting head support pedestal 19 is fixed to and rises from the plate 18 and has a cap plate 20 fixed to its upper end. A horizontal support plate 21 for a vertical cutting head guide means 20' is adjustably secured on cap plate 20 through means to be described.

Figure 2:
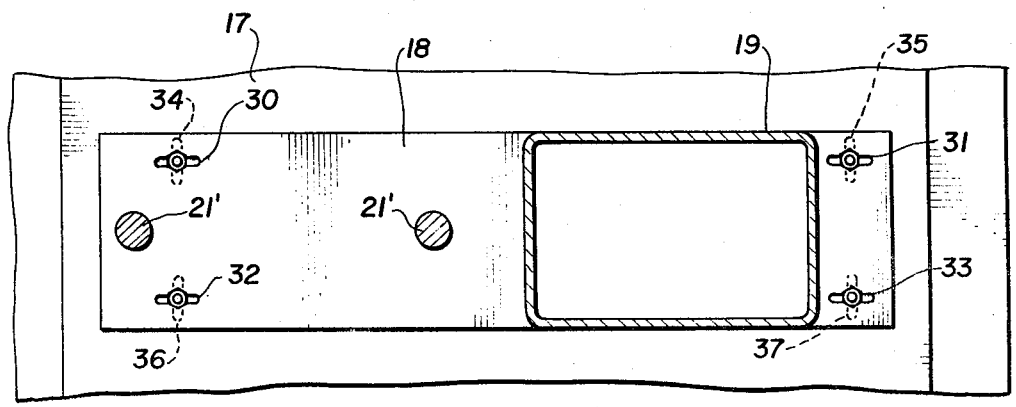
FIG. 2 is an enlarged horizontal section taken on line 2—2 of FIG. 1.

With reference to FIG. 4 and FIG. 2, the support plate 21 contains four longitudinal adjusting slots 22, 23, 24 and 25. The underlying fixed cap plate 20 similarly contains transverse adjusting slots 26, 27, 28 and 29 disposed at right angles to the slots 23 and being in registration therewith. In a like manner, FIG. 2, sub-base plate 18 contains longitudinal adjusting slots 30, 31, 32 and 33 in registration with transverse perpendicular adjusting slots 34, 35, 36 and 37 contained in the underlying fixed mounting plate 17.

Adjustment of the support plate 21 on cap plate 20 and similar adjustment of the sub-base plate 18 on fixed mounting plate 17 allows the vertical guide means 20' to be mounted plumb. This guide means includes two parallel vertical posts 21' whose top and bottom ends are fixed to the plates 21 and 18.

A vertical axis motor 38 is mounted on adjustable plate 21 fixedly. A depending driving screw shaft 39, which is an extension of the motor armature shaft, interacts with a nut 40 to cause vertical movement of two spaced horizontal bracket arms 41 and 42, rigidly interconnected at their forward ends by a drum member 43. The bracket arms 41 and 42 are guidably engaged with the vertical posts 21'. Half circle gear sectors 44 and 45 are adjustably attached to opposite sides of drum member 43 through upper and lower opposite side pairs of projecting short support arms 46 and 47 fixed to the drum member 43, FIGS. 1 and 4. The gear sector 44 near its top and bottom contains pairs of horizontal adjusting slots 48, while the sector 45 is similarly provided with upper and lower spaced pairs of vertical adjusting slots 49, FIG. 6. The adjusting slots 48 and 49 receive locking bolts 50 which are received by threaded openings in the ends of support arms 46 and 47.

Pantograph arm 51 is fixedly attached to gear sector 44, while pantograph arms 52, 53, 54 and 55 are movable with relation to fixed gear sector 44. Pantograph arm 55 also serves as a mounting base for saw blade motor 56, which motor through its shaft 57 and an attached mandrel 58 drives the saw blade 11. Additionally, pantograph arm 55 serves as a mounting surface for a saw blade angle positioning drive motor 59, as shown in the drawings. A pinion gear 60 fixed to the shaft 61 of drive motor 59 meshes with a gear sector 44 and causes the pantograph arm 55 to walk around the periphery of gear sector 44, substantially as disclosed in the referenced prior patent. This, in turn, adjusts the cutting angle of saw blade 11.

Similarly, pantograph arm 62 serves as the mount for saw blade drive motor 63 and for saw angle positioning motor 64. Pinion gear 65 fixed to the shaft 66 of motor 64 causes the pantograph arm 62 and the associated pantograph linkage, FIG. 6, to travel around the periphery of gear sector 45, and in turn change the cutting angle of the saw blade 12. The saw blade 12 is attached to the shaft 67 of motor 63. Pantograph arm 68 which corresponds to the previously-described arm 51 is fixedly attached to sector gear 45. The pantograph linkage including arms 62 and 68 further consists of movable arms 69, 70 and 71 and 72, FIG. 6. It can be seen that the two pantograph linkages associated with sector gears 44 and 45 are essentially the same in their construction and operation although they are inverted one relative to the other as shown by a comparison of FIGS. 3 and 6.

A bracket 73 is fixed to the forward side of drum member 43, FIG. 1. Another bracket 74 beneath the bracket 73 is attached to the gear sector 45 on its interior side. An adjusting screw 75 is threaded into an opening of the bracket 74 and carries a locking nut 76, as shown.

The radial center of gear sector 44 having the horizontal adjusting slots 48 is set to the exact height of the rigging wire 14 by raising or lowering the drum member 43 by means of the motor 38 which drives screw shaft 39. The radial center of the other gear sector 45 having the vertical adjusting slots 49 is set to the height of the rigging wire 14 by the lockable adjusting screw 75. The radial center of gear sector 45 is set coincident with the rigging wire 14 by adjusting the pedestal 19 horizontally by means of the adjusting slots in the horizontal support plate 21 and in the sub-base plate 18. The radial center of the gear sector 44 is set coincident with the rigging wire 14 by means of its adjusting slots 48.

As shown in FIG. 7, the saw blade 11 is attached to the mandrel 58 and this mandrel in turn is attached to the shaft or arbor 57. The mandrel 58 is secured to the arbor 57 by a set screw 77. A longitudinal slot 78 formed in the hub of the mandrel allows the latter to be positioned on the shaft or arbor 57 by a roll pin 79 held in a cross opening of the shaft 57. This arrangement limits axial movement of the mandrel 58 on the shaft 57 and prevents the mandrel and saw blade from separating from the shaft 57 in the event that the set screw 77 should loosen.

The saw blade drive motor 56 is attached to a sub-base 80 and is axially adjustable by means of horizontal sub-base slots 81 arranged in two spaced pairs, as shown. The sub-base 80 is also adjustable across the axis of the motor 56 by means of vertical adjusting slots 82 provided in the pantograph arm 55, FIG. 5. The respective slots 81 and 82 cross each other and register, and the slots receive locking bolts 83.

In a like manner, the saw blade 12 is attached to its mandrel 84, FIG. 4, and the mandrel 84 is connected to the arbor or shaft 67 of motor 63 in the exact manner detailed in FIG. 7 and previously described in connection with the blade 11. Thus, both saw blades possess the same safety mounting on their shafts whereby they cannot leave the shafts should their locking set screws 77 loosen.

Figures 5, 6:
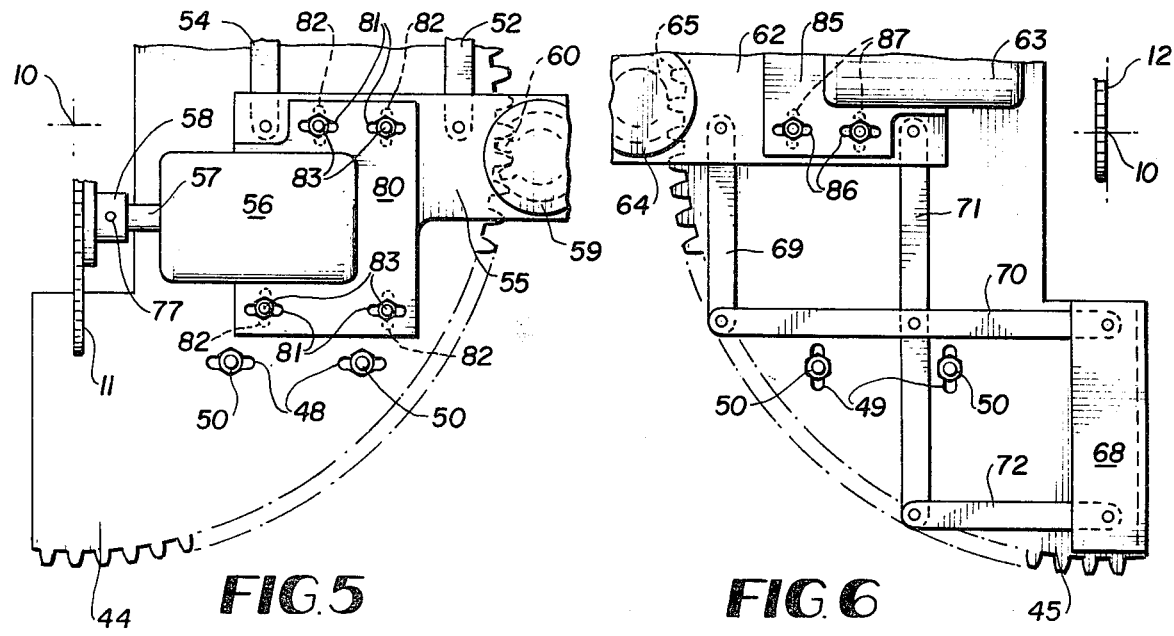
FIG. 5 is an enlarged fragmentary elevational view showing in greater detail the adjustable mounting for one saw blade on one primary support system of the apparatus.
FIG. 6 is a similar view showing in greater detail the adjustable mounting for the second saw blade of the same primary support system of the apparatus.

The saw blade drive motor 63 on sub-base plate 85, FIG. 6, is axially adjustable by means of horizontal sub-base slots 86 which lie at right angles and register with underlying vertical slots 87 in the movable pantograph arm 62. The adjusting means for the motor 63, therefore, is essentially identical to the corresponding adjusting means for the motor 56 shown in FIG. 5, including slots 81 and 82.

It may now be understood that the precision positioning system for the truss lumber component saw blades provides a large number of diverse yet coordinated adjustments of critical parts in the primary support system 13. Most of the adjustments afforded by intersecting right angular adjustment slots are universal in nature. As a result, the blades 11 and 12 can be adjusted with great precision so that their forward faces will lie on and pivot around the fixed reference axis defined by the taut wire 14. Without the disclosed precision adjustment system, it is virtually impossible to maintain the proper positioning of the saw blades or other rotary cutting tools.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A system for positioning rotary cutting tools with precision on a primary support structure for such cutting tools, comprising a primary supporting base, a pedestal rising from the base, a cutter head vertical guideway supported by the pedestal adjacent to one side of the pedestal, a drum carriage means movably engaged with said guideway for movement upwardly or downwardly thereon, power means engaged with the drum carriage means to drive the latter upwardly or downwardly on said guideway, a cutter head carried by the drum carriage means including a pair of gear sectors mounted on opposite sides of the drum carriage means to travel vertically therewith upwardly or downwardly along said guideway, a pantograph linkage including a fixed arm attached to each gear sector and including movable arms, a rotary cutting tool drive motor on one movable arm of each pantograph linkage and a pantograph linkage drive motor including a drive pinion on said one movable arm of each Pantograph linkage with said pinion in mesh with the teeth of the adjacent gear sector, the improvement comprising means to universally adjust said pedestal on the supporting base horizontally, means to adjust at least the top of said drum carriage means universally horizontally relative to said pedestal, means to adjust one of said gear sectors horizontally on the drum carriage means, means to adjust the other gear sector vertically on the drum carriage means, and means to adjust each rotary cutting tool drive motor in a vertical plane universally on the movable pantograph linkage arm which carries such drive motor.

2. A system for positioning rotary cutting tools as defined in claim 1, and an additional means interconnecting the drum carriage means and said other gear sector to finely adjust said other gear sector vertically on the drum carriage means relative to the other gear sector.

3. A system for positioning rotary cutting tools as defined in claim 1, and each of said means to adjust comprising slotted connections between the parts requiring adjustment, and means to lock said slotted connections in selected adjusted positions.

4. A system for positioning rotary cutting tools as defined in claim 3, and each of said means to universally adjust including a pair of orthogonally arranged registering adjustment slots, and clamping fastener elements engaging through said registering slots.

5. A system for positioning rotary cutting tools as defined in claim 4, and each rotary cutting tool comprising a rotary circular saw blade.

6. A precision positioning system for rotary saw blades of truss lumber component cutting machines wherein the saw blades are required to pivot around a fixed horizontal reference axis lying on the forward faces of the saw blades in order to produce required angle cuts of truss lumber components without varying their required lengths, the improvement comprising supporting means for the saw blades, means to adjust the supporting means in a horizontal plane universally and to lock the supporting means in a selected position in such plane, means to bodily adjust the saw blades vertically on the supporting means, means to adjust one saw blade vertically relative to at least another saw blade of the system and to lock the same in a selected vertically adjusted position, means to adjust at least another saw blade horizontally relative to the vertically adjustable saw blade and to lock the same in a selected horizontally adjusted position, and additional means to adjust each saw blade universally in a vertical plane and to lock it relative to the other saw blade and relative to the third and fourth-named means to adjust.

7. A precision positioning system as defined in claim 6, and said means to bodily adjust the saw blades vertically comprising a carriage means for the saw blades on the supporting means, and a screw operator drivingly connected with the carriage means to move the carriage means upwardly or downwardly vertically.

8. A precision positioning system as defined in claim 7, and said third and fourth-named means to adjust one saw blade and another saw blade comprising respectively vertical and horizontal slot adjustment means, and locking means for the vertical and horizontal slot means.

9. A precision positioning system as defined in claim 8, and said additional means to adjust each saw blade universally comprising orthogonal registering slot adjusting means, and locking means for said orthogonal slot adjusting means.

10. In a truss component production cutting machine of the class in which sections of lumber are conveyed on a linear path in a horizontal plane through spaced opposing gangs of rotary saw blades to produce truss components of required lengths with their ends cut at required angles, a primary support means for a gang of said saw blades, means to universally adjust the primary support means in a horizontal plane and to lock the primary support means in a selected adjusted position, a vertical saw blade guideway on the primary support means, means to adjust at least the top of said guideway universally in a horizontal plane and to lock the guideway in a selected adjusted position, a vertical movement carriage means on the guideway, power means to drive the carriage means upwardly or downwardly on the guideway and to hold the carriage means at a selected adjusted elevation on the guideway, a gear sector support for each saw blade on the carriage means, means to adjust at least the gear sectors of an adjacent pair vertically and horizontally respectively and to lock the gear sectors of the pair in selected vertical and horizontal positions, pantograph carrier linkages attached to each gear sector and including a movable support arm, drive means on the movable support arm to drive such arm in an arcuate path around the periphery of the adjacent gear sector, and a rotational driving means for each saw blade on each movable support arm of said pantograph linkage, and means to adjust each said drive means universally in a vertical plane and to lock it in a selected adjusted position with respect to the movable support arm.

11. In a truss component production cutting machine as defined in claim 10, and an additional fine vertical adjustment means for the gear sector which is vertically adjustable connected between such gear sector and a part of the carriage means.

* * * * *